United States Patent [19]
Resch

[11] Patent Number: 4,783,128
[45] Date of Patent: Nov. 8, 1988

[54] BRAKE PRESSURE CONTROL UNIT WITH HYDRAULIC POWER BOOSTER INCLUDING ANTILOCKING AND PROPULSION REGULATION

[75] Inventor: Reinhard Resch, Stuttgart, Fed. Rep. of Germany

[73] Assignee: Daimler-Benz Aktiengesellschaft, Fed. Rep. of Germany

[21] Appl. No.: 100,474

[22] Filed: Sep. 24, 1987

[30] Foreign Application Priority Data

Sep. 24, 1986 [DE] Fed. Rep. of Germany ....... 3632507

[51] Int. Cl.$^4$ .......................... B60T 8/44; B60T 13/14
[52] U.S. Cl. ................................... 303/114; 60/547.1; 60/562; 60/582; 188/345; 188/358; 303/52; 303/116; 303/119; 303/92; 303/22.1
[58] Field of Search ...................... 60/547.1, 562, 582, 60/545, 534, 550, 553, 591, 581, 588; 303/114, 50–56, 92, 100, 22, 100, 113, 116, 119, 115; 188/345, 355–360, 195

[56] References Cited

U.S. PATENT DOCUMENTS

| | | |
|---|---|---|
| 4,405,181 | 9/1983 | Resch et al. ........................ 303/92 X |
| 4,405,183 | 9/1983 | Resch ................................. 303/52 X |
| 4,480,877 | 11/1984 | Resch ................................... 303/116 |
| 4,629,258 | 12/1986 | Resch et al. ........................... 303/92 |
| 4,687,259 | 8/1987 | Reinartz et al. ..................... 303/114 |
| 4,715,661 | 12/1987 | Leiber ............................. 303/114 X |
| 4,726,629 | 2/1988 | Resch .................................. 303/92 |

FOREIGN PATENT DOCUMENTS

3347618 7/1985 Fed. Rep. of Germany .
3417018 11/1985 Fed. Rep. of Germany .

*Primary Examiner*—Douglas C. Butler
*Attorney, Agent, or Firm*—Barnes & Thornburg

[57] ABSTRACT

A brake pressure control unit operable by a hydraulic brake power booster and functionally corresponding to a tandem master cylinder for two statically pressurizable brake circuits has two casing bores spaced laterally apart. In one of the bores, the primary output pressure space bounded by the primary piston and floating piston is accommodated, and in the second bore, a piston which is also a floating piston, bounds the secondary output pressure space by a piston flange. The floating piston bounding the primary output pressure space on one side has the effect of building up, in the end control pressure spaces of the first and second bores, the control pressure acting on the second floating piston. This pressure leads to a displacement of the second floating piston in the sense of a pressure build-up in the secondary pressure space. The second floating piston is connected to a double-acting hydraulic cylinder, which is likewise accommodated in the second casing bore. By alternative pressurization and relief of working spaces of the hydraulic cylinder taking place via electrically controllable valves, antilocking and propulsion regulation functions are made possible in the brake circuit connected to the secondary output pressure space. The primary piston of the brake pressure control unit has an annular piston and a plunger piston, having annular seals which impart reciprocal sealing and also sealing from the primary piston bore. By these annular seals, axially extending, coaxially arranged separating spaces are bounded, these spaces imparting an effective media separation between the hydraulic booster circuit and the primary brake circuit.

9 Claims, 2 Drawing Sheets

BRAKE PRESSURE CONTROL UNIT WITH HYDRAULIC POWER BOOSTER INCLUDING ANTILOCKING AND PROPULSION REGULATION

BACKGROUND AND SUMMARY OF THE INVENTION

The present invention relates to a brake pressure control unit for a hydraulic dual circuit brake system of a road vehicle which is equipped with a hydraulic brake power booster which comprises a constantly supercharged hydraulic pressure accumulator and a brake valve connected to the accumulator. The accumulator inputs into a drive pressure space of the brake pressure control unit when the brake system is operated, a pressure which is proportional to an operating force and acts directly on a drive surface of a primary piston. This pressure imparts a longitudinal displacement on the primary piston and also a longitudinal displacement on a secondary piston in the sense of a brake pressure build up and a primary output pressure space and in a secondary output pressure space of the brake pressure control unit respectively. This vehicle has a static brake circuit connected to each of the primary and secondary output pressure spaces. The primary piston comprises an annular piston sealed from a bore of a casing, and a plunger piston arranged displaceably in a central bore of this annular piston and sealed from the annular piston. The plunger piston has a radial driving flange against which the annular piston is supportable by its end face toward the primary output pressure space. The annular piston and the plunger piston are pressurizable by the drive pressure inputtable into the drive pressure space and jointly displaceable in a sense of a brake pressure build up. The plunger piston remains displaceable by pedal power alone during a failure of an auxiliary pressure source.

Such a brake pressure control unit is known from German Published Unexamined Patent Application No. 3,347,618. In this known brake pressure control unit, the hydraulic auxiliary pressure supply source is also operated with brake fluid as a working medium. This has the disadvantage that a separate, electrically operated charge pump has to be provided for charging the pressure accumulator which is provided in association with the auxiliary pressure source and has to be kept constantly at high output pressure. This pump is switched on only intermittently, when the pressure in the pressure accumulator has dropped below a tolerable minimum value. The only intermittent operation of the accumulator charge pump is necessary since the lubricity of the usual brake fluid is not sufficient to ensure an adequate service life of an accumulator charge pump of the usual type operated with brake fluid, driven constantly, for example by the vehicle engine. In order to be able to utilize such a permanently driven accumulator charge pump, for example the pressure supply pump in a central hydraulic unit of the vehicle, for brake power boosting as well, it would be necessary to be able to operate the hydraulic booster circuit with a hydraulic oil of good lubricity. However, this would require a hydraulic media separation between the booster circuit and the primary output pressure space of the brake pressure control unit. Although such a media separation could be realized by creating in the known brake pressure control unit an additional separating space between an annular drive space and a follow-up space, which are delimited from each other by a piston flange of the annular piston of the primary piston of the known brake pressure control unit, and by also performing a corresponding measure with respect to the plunger piston of the known brake pressure control unit, that would however entail an increase in the overall length by at least one piston stroke, giving rise to unjustifiably adverse installation conditions in practice.

Therefore, an object of the present invention is to provide a brake pressure control unit for a hydraulic dual circuit brake system which, at the same time as having a favorable small overall length, makes possible a brake power booster circuit both for an operation of the booster circuit with brake fluid and conventional hydraulic oil.

This and other objects are achieved according to preferred embodiments of the present invention by providing in a brake pressure control unit a first annular seal of the annular piston on the piston side, a flange facing the drive pressure space on which the first annular seal is arranged, and a second annular seal fixed to the casing and arranged on the end section facing the primary output pressure space of the casing bore guiding the annular piston. These first and second annular seals form an outer separating space in the shape of an annular gap. A third annular seal is arranged on an inner bore of the drive flange of the annular piston, while a fourth annular seal is arranged at the plunger piston and is offset in the direction of the primary output pressure space, these third and fourth annular seals sealing the annular piston and the plunger piston from each other.

The following are at least some of the advantages hereby achieved by the brake pressure control unit according to the invention:

The arrangement of an outer separating space, between the casing and an annular piston, which imparts the media separation between the hydraulic booster circuit and the primary output pressure space of the brake pressure control unit and whose axial extent varies with the displacement of the primary piston, has the effect that the extension of the brake pressure control unit by a distance corresponding to a maximum piston stroke, which is otherwise necessary for realization of such a separating space, is avoided. To this extent, an overall length corresponding to a "normal" tandem master cylinder is maintained and nevertheless an effective media separation between the drive pressure space of the brake power booster and the primary output pressure space of the brake pressure control unit is attained.

The brake power booster can be operated optionally with brake fluid or with a hydraulic oil which has an adequate lubricity for a pump permanently driven by the vehicle engine to be used as an accumulator charge pump. If hydraulic oil is used, the accumulator pressure is maintainable at the necessary value by a simple relief valve, since no electrical pressure switch for controlling an electric charge pump to be intermittently activated is required. The media separation on the plunger piston side by two annular seals, one of which is arranged at the annular piston and the other of which is arranged at the plunger piston, is generally, that is to say with intact brake power booster, fully adequate, since the annular piston and the plunger piston do not execute any relative movements with respect to each other.

By providing a plunger piston which is a step piston, a separating space is created between the annular piston and the plunger piston, which makes possible an even more effective media separation between the drive pressure space of the brake power booster and the primary output pressure space of the brake pressure control unit.

This effective media separation is enhanced in certain preferred embodiments in which the annular piston has an annular groove which communicates with the outer separating space via a cross-channel.

The inclusion of a second separating space, and the filling of the two separating spaces with a separating medium or the venting to atmosphere of these spaces, provides enhanced effectiveness of the media separation.

The design of a balancing valve according to certain preferred embodiments of the present invention, allows the necessary brake fluid balancing flow to take place between the brake fluid reservoir and the primary output pressure space of the brake pressure control unit, which otherwise can have the design of a tandem master cylinder of the conventional type.

According to features of certain preferred embodiments, the brake pressure control unit according to the invention is utilized in combination with electrically triggerable solenoid valves, which can be triggered by known control criteria, for an antilocking regulation, a propulsion regulation at the driven vehicle axle, and an increase which is appropriate for the axle load, and the brake pressure at the rear vehicle axle. This control is realizable for example by the brake slip at the rear axle constantly being regulated at a value associated with good braking acceleration. A particular advantage of the present invention is that a favorably small overall length of the brake pressure control unit is realizable even when utilizing these additional functions.

Other objects, advantages and novel features of the present invention will become apparent from the following detailed description of the invention when considered in conjunction with the accompanying drawings.

DETAILED DESCRIPTION OF THE DRAWINGS

Figure 1:
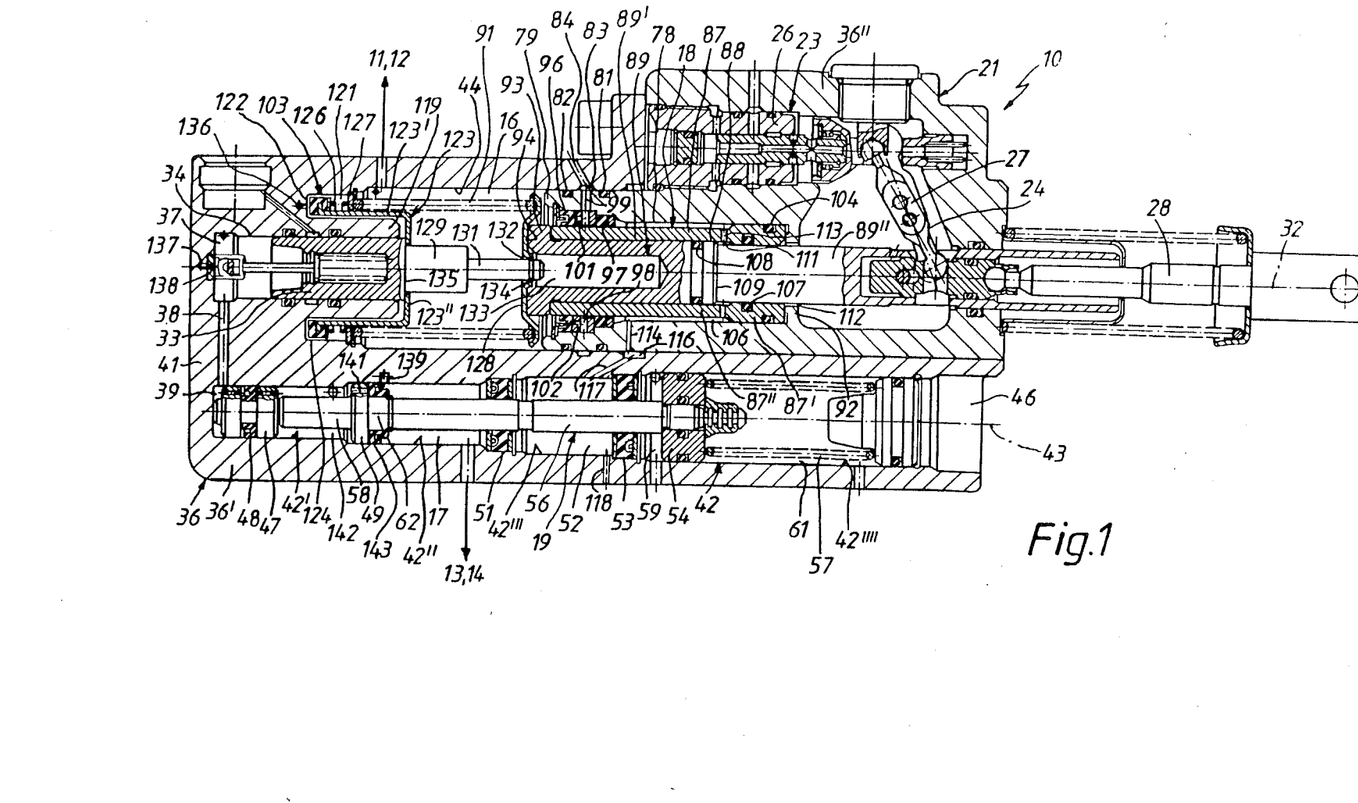
FIG. 1 is a sectional view of a brake pressure control unit along the central axes of its casing bores, constructed in accordance with a preferred embodiment of the present invention.
Figure 2:
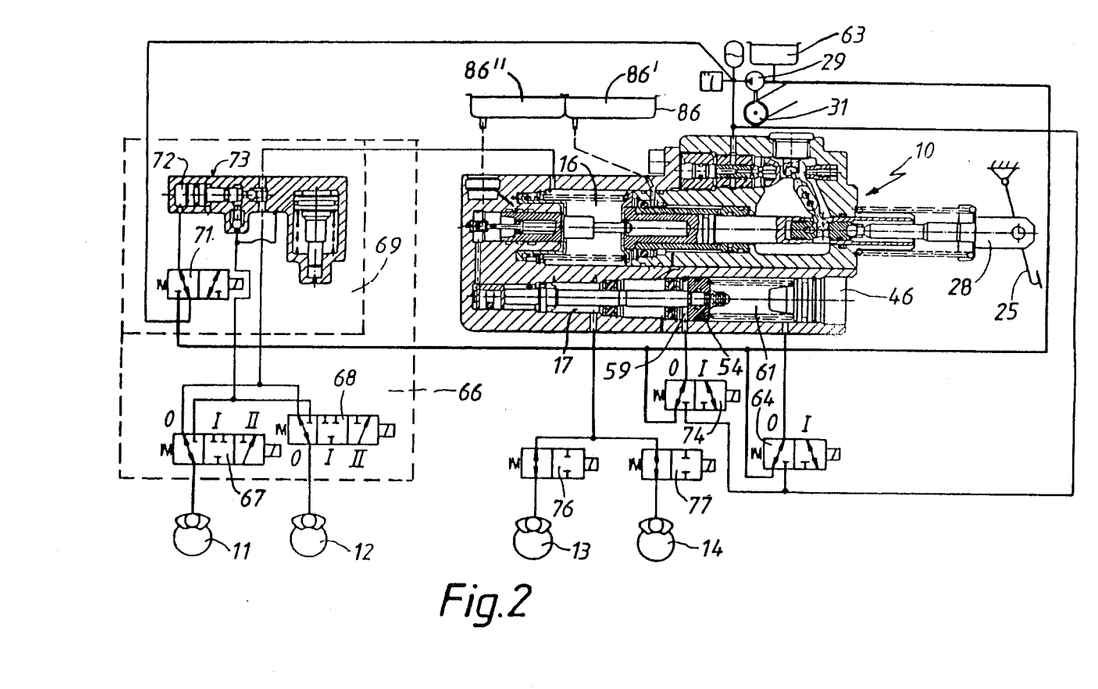
FIG. 2 is a hydraulic diagram for explanation of the use of the brake pressure control unit of FIG. 1 in a vehicle with an antilocking system and a propulsion regulation system acting on the drive axle.

The brake pressure control unit 10, represented in structural details in FIG. 1, the particulars of which are first discussed, and by a specific example of use in FIG. 2, the particulars of which are also discussed, is for the generation of the brake pressures in a hydraulic dual circuit brake system of a road vehicle (not otherwise shown). For the purposes of explanation, this vehicle is assumed to be a vehicle with rear-axle drive and which is equipped with an antilocking system which operates with individual brake pressure regulation at the wheel brakes 11 and 12 of the front wheels of the vehicle and with joint brake pressure regulation, based on the known select-low principle, at the wheel brakes 13 and 14 of the driven rear wheels.

In addition, in certain preferred embodiments, the vehicle is also equipped with propulsion regulation device (ASR system) which operates on the principle of keeping the drive slip of a vehicle wheel with a tendency to spin constantly within a value range which is compatible with both good propulsive acceleration and adequate driving stability by activation of the wheel brake 13 or 14 of the respective wheel.

The front axle brake circuit 11, 12 is connected to a primary output pressure space 16, and the rear axle brake circuit 13, 14 is connected to a secondary output pressure space 17 of the brake pressure control unit 10. In these spaces, brake pressure can be built up statically by pedal power-controlled displacement, assisted by hydraulic auxiliary power, of a primary piston generally denoted by 18 and of a secondary piston generally denoted by 19. The auxiliary power assistance is provided by a hydraulic brake power booster generally denoted by 21 of a type and function which are known. The power booster 21 comprises a pressure accumulator 22, which is kept at high pressure of, for example, 160 bar, and a brake valve 23, which can be operated by means of the brake pedal 25, is designed as a proportional control valve. By means of this brake valve 23, an auxiliary pressure, proportional to the pedal operating force, is derived from the high output pressure of the pressure accumulator 22 and with a maximum value corresponding to the output pressure of the pressure accumulator 22, can be input into a working pressure space 24 of the brake pressure control unit 10. This auxiliary pressure acts on drive surfaces of the primary piston 18, on the side of the working pressure space 24, and thereby imparts its auxiliary power-assisted displacement. Layout and function of the brake valve 23, whose valve piston 26 is linked by a control lever 27 to the connecting rod 28 coupled to the brake pedal 25, are described in detail in German Published Unexamined Patent Application No. 3,417,018, herein incorporated by reference.

Unlike the brake power booster described in that reference, the brake power booster 21 provided as part of the brake pressure control unit 10 in the present invention is not operated with brake fluid as working medium, but with a conventional hydraulic oil, which can also be used as working medium within a permanently effective hydraulic servo steering system or a hydraulic level of regulation. The hydraulic oil has a high lubricity, so that a pump permanently driven by the vehicle engine 31, which is provided for example as part of a central hydraulic unit of the vehicle as a supplier for a number of hydraulic consumers, is used as accumulator charge pump 29 in the illustrated embodiment.

The brake pressure control unit 10 is, in its upper part according to FIG. 1, along whose central longitudinal axis 32 the primary piston 18, the primary output pressure space 16 and a floating piston generally denoted by 33 are arranged, designed like a tandem master cylinder of the usual type to the extent that there is also in the brake pressure control unit 10, due to the floating piston 33 against the primary output pressure space 16, a pressure space 37. This pressure space 37 is otherwise bounded by a blind hole-shaped bore 34 of the casing 36. In this pressure space 37, a pressure which corresponds to the pressure built up in the primary output pressure space 16 is built up when the brake pressure control unit 10 is operated. In a conventional tandem master cylinder, the second brake circuit of the brake system would be connected to this pressure space 37, which is referred to hereinafter as the control pressure space 37.

Unlike the conventional tandem master cylinder, the control pressure space 37 is connected via a radial cross-channel 38 so as to communicate with a second control pressure space 39, which is terminated in axial direction by the end wall 41, on the left according to FIG. 1, of the casing 36 and is radially bounded by the end section 42′ of a multistage casing bore, generally denoted by 42. The central axis 43 of the casing bore 42 runs parallel to the central axis 32 of the blind bore 34 and a casing bore 44 bounding the primary output pressure space 16, and is below the casing bore 44 in the representation of FIG. 1. The casing bore 42 extends over the entire axial length of the casing 36 and is closed pressure-tight at its end on the pedal side by a plug 46.

The movable bounds of the second control pressure space 39 are formed by a drive piston 47, which is sealed from the bore end section 42′ by an annular seal 48 designed as a lip seal. Adjoining the end section 42′ of the bore 42 is a bore stage 42″ of somewhat greater diameter, in which the piston flange 49 of the secondary piston 19 is displaceably guided pressure-tight. This flange 49 movably bounds the secondary output pressure space 17 to which the rear axle brake circuit 13, 14 is connected.

The axial bounds of the secondary output pressure space 17 fixed to the casing 46, and bounded in radial direction by the bore stage 42″, are formed by a sealing sleeve 51, which delimits the secondary output pressure space 17 with respect to a pressureless separating space 52 following in axial direction. This separating space 52 is bounded in radial direction by the next stage 42‴ of the casing bore 42 and axially by a further sealing sleeve 53, which is arranged an axial distance from the sealing sleeve 52 and delimits the separating space 52 pressure-tight from the end section 42″ of the casing bore 42. The end section 42⁗ is on the pedal side, on the right according to FIG. 1, and has a diameter which is clearly, that is to say approximately 1.5 to 2 times, greater than the diameter of the bore end section 42′ of the bore 42 radially bounding the second control pressure space 49.

Within this widest bore section 42⁗, terminated on the pedal side by the plug 46, a drive piston 54 is displaceably guided pressure-tight. This drive piston 54 is connected by an elongated piston rod 56, which passes displaceably pressure-tight through the sealing sleeves 51 and 53 bounding the separating space 52 in axial direction, to the piston flange 49 of the secondary piston 19.

A biased restoring spring 57, arranged between the plug 46 and the drive piston 54, has the effect of urging the secondary piston 19 into the basic position represented in FIG. 1. In this position, the piston 19 supports itself via a push rod-shaped extension 58 against the drive piston 47 movably bounding the second control pressure space 39 and likewise urges the drive piston 47 into its illustrated basic position.

The drive piston 54 also delimits within the largest bore stage 42⁗, pressure-tight from each other, two spaces which are utilized as drive pressure spaces 59 and 61 of a double-acting hydraulic cylinder. The bounds of these spaces 59, 61, fixed to the casing, are respectively formed by the sealing sleeve 53 and the plug 46. The diameter $D_1$ and $D_2$ of the drive piston 47 bounding the control pressure space 39′ within the bore section 42′ and of the piston flange 49 of the secondary piston 19 bounding the secondary output pressure space 17 are chosen such that their respective effective piston surfaces, for piston flange 49 this is the annular surface 62, are of equal or at least approximately equal size. Thus, if the brake system is operated, at least in a brake pressure build-up phase, the pressure prevailing in the control pressure space 39 is transferred at a ratio of 1:1 to the secondary output pressure space 17.

Finally, the drive piston 54 is designed such that, if the accumulator output pressure is fed into the annular drive pressure space 59 of the double-acting cylinder 59, 54, 61, a high brake pressure can be built up very rapidly in the secondary output pressure space 17 of the brake pressure control unit 10. As an alternative to this feed into the space 59, if the accumulator output pressure is fed to the other drive pressure space 61 of the double-acting hydraulic cylinder, and the pressure in the first-mentioned pressure space 59 is relieved, the secondary piston 19 can be displaced, even against a high pressure prevailing in the control pressure space 39, in the sense of a volume enlargement of the secondary output pressure space 17.

Before further structural details of the brake pressure control unit 10 are explained below, reference should be had to FIG. 2 for an explanation of the manner in which the double-acting hydraulic cylinder 59, 54, 61 is utilized to achieve an antilocking regulation at the rear axle, by known control criteria, details of which will therefore not be discussed.

Assume that the working space 59, bounded on one side by the drive piston 54, is pressureless, for example in constant communicating connection with the hydraulic oil reservoir 63 of the auxiliary pressure source. In order to realize an antilocking regulation operating on the select-low principle at the rear vehicle axle, all that is required is a single first change-over valve 64, in the illustrated embodiment shown as a ⅔-way solenoid valve, which can be controlled out of its illustrated basic position 0 by an electrical output signal of an electronic control unit of the antilocking system.

In the basic position 0, the drive pressure space 61 bounded in axial direction by the drive piston 54 and the plug 46 is connected to the hydraulic oil reservoir 63 of the auxiliary pressure source. In the excited position I of the valve 64, the output of the pressure accumulator 22 is instead connected to this drive pressure space 61, as a result of which the drive piston 54 is actuated in the sense of a return movement of the secondary piston 19. This leads to a volume enlargement of the secondary output pressure space 17 and thereby to a brake pressure reduction in the rear axle brake circuit 13, 14. The response of the regulation is perceptible at the brake pedal 25, which is pushed back against the pressure of the driver's foot.

A functional part of the antilocking system, which is shown in the left part of FIG. 2, is denoted generally by 66 and imparts an independent antilocking brake pressure regulation on the front wheels of the vehicle. This functional part 66 comprises, in a known functional combination, two brake pressure control valves 67 and 68, which are designed as 3/3-way solenoid valves. These control valves are activated by brake pressure control signals of the electronic control unit and are controllable from a pressure build-up position 0, constituting the basic position, into a pressure holding position I or a pressure reduction or return position II. In the return position II, brake fluid can be pumped back from the respective wheel brake 11 and/or 12 subjected to the regulation by a return pump 69 into the primary output pressure space 16 of the brake pressure control unit 10.

In the specific exemplary embodiment illustrated, the return pump 69 is a hydraulically driven pump 73, for the drive control of which a further control solenoid valve 71, designed as 3/2-way solenoid valve, is provided. This valve 71 periodically and in an alternating manner connects the drive pressure space 72 of the piston pump 73 to the high-pressure output of the pressure accumulator 22 or else the hydraulic oil reservoir 63 of the auxiliary pressure source of the brake power booster 21. The valve 71 is likewise controlled by control output signals of the electronic control unit of the antilocking system.

For the additional or alternative realization of a propulsion regulation at the driven rear axle of the vehicle, there are provided in connection with the brake pressure control unit 10 a second change-over valve 74, designed as a ⅜-way solenoid valve, and two ASR control valves 76, 77 individually assigned to the wheel brakes 13 and 14 of the rear axle brake circuit, in the hydraulic circuit arrangement which can be seen in detail in FIG. 2.

The change-over valve 74 is controllable by an output signal of an electronic control unit (likewise not shown) of the propulsion regulation system, which indicates that a tendency to spin is occurring at one or both of the driven vehicle wheels. The valve 74 is controlled from its illustrated basic position 0, in which the annular drive pressure space 59 of the double-acting hydraulic cylinder 59, 54, 61 is connected so as to communicate with the hydraulic oil reservoir 63 of the hydraulic auxiliary pressure source, into an excited position I, in which this drive pressure space 59 is instead connected to the high pressure outlet of the pressure accumulator 22.

The first change-over valve 64 belonging to the antilocking system is not activated during a propulsion regulation phase and stays in its illustrated basic position 0, so that the drive pressure space 61 remains pressureless in control phases of the propulsion regulation. The pressurization of the annular drive pressure space 59 has the effect of a displacement in FIG. 2 to the right of the piston 54 and with it the secondary piston 19 of the brake pressure control unit in the sense of a pressure build-up in the rear axle brake circuit 13, 14.

The ASR control valve 76 or 77 of the wheel subjected to the propulsion regulation remains in its flow position, the basic position 0, while the ASR control valve 76 or 77 of the respective vehicle wheel not subjected to the regulation is controlled into its block position. A brake pressure reduction phase, in each case constituting the termination of a propulsion regulation cycle, can be accelerated by the first change-over valve 64, which essentially imparts the antilocking function, also being controlled into its excited position I, in order to accelerate, as it were, the pressure reduction movement of the secondary piston 19.

In an analogous way, a pressure build-up phase necessary as part of an antilocking control cycle could be "accelerated" by activation of the change-over valve 74, which is essentially assigned to the propulsion regulation.

The layout of the brake pressure control unit 10 according to the invention explained thus far has the primary output pressure space 16 and the secondary output pressure space 17 arranged alongside each other spaced radially apart with parallel running of their central longitudinal axes 32 and 43, and the primary piston 18 and the secondary piston 19 execute, as it were, "anti-parallel" movements when there is a brake pressure build-up or reduction. This arrangement has the effect that the double-acting hydraulic drive cylinder 59, 54, 61, which is provided for control of the brake pressure reduction for an antilocking regulation or for the control of the brake pressure build-up in the case of an ASR regulation, can also be accommodated within the overall length of the casing 36 of the brake pressure control unit, this length corresponding to that of a conventional tandem master cylinder with hydraulic brake power booster.

To explain further structural details of the brake pressure control unit 10 of the present invention, reference will be made to FIG. 1.

The casing 36 of the brake pressure control unit 10 comprises a casing part 36′, into which the casing bore 44 bounding the primary output pressure space 16 and, to the side of it, also the stepped bore 42 are made, and a second casing part 36″. A bore 78, which is coaxial to the primary output pressure space 16, opens out into the second casing part 36′. The primary piston 18 is displaceably guided in this bore 78 and is sealed from the second casing part 36″.

This second casing part 36″ protrudes by a short, circular-cylindrical/tubular adapter 79, whose external diameter corresponds to the internal diameter of the bore 44 bounding the primary output pressure space 16, into the bore 44 and is sealed from this bore 44 by two annular seals 81 and 82 spaced axially apart. Between these two annular seals 81 and 82, the casing part 36″ surrounding the seals 81, 82 on the outside is provided with an inner annular groove 83, which is connected via a substantially radially running channel 84 of the first casing part 36′ so as to communicate with the chamber 86′ assigned to the front axle brake circuit 11, 12 (FIG. 2) of the brake fluid reservoir 86 of the brake system 10, 11, 12, 13, 14, 25 of the vehicle.

The primary piston 18 is of two-part design. It comprises a larger annular piston, generally denoted by 87, and a plunger piston, which is generally denoted by 89 and is displaceably guided in a central bore 88 of this annular piston 87 and sealed from the piston 87. These two pistons 87, 89 are displaceable together into the primary output pressure space 16 when there is a pressure build up in the space 16, by admission of the output pressure of the brake valve 23 to the drive pressure space 24 of the brake power booster 21.

The primary piston 18 is urged by a restoring spring 91 into the basic position illustrated, corresponding to the non-operated state of the brake system, in which the annular piston 87 supports itself by an annular flange 87′ on the pressure space side against a stop flange 92 of the casing part 36″, this stop flange 92 being annular and protruding radially inward. The plunger piston 89 supports itself by an annular end face flange, which is on the pressure space side and points radially outward, against the annular end face 94 of the annular piston 87. On the primary pressure space side, the section 87″ of the annular piston 87, which extends between its end face 94 and its piston flange 87′, has the shape of a circular-cylindrical/tubular sleeve. This sleeve-shaped section 87″ of the annular piston 87 is sealed from the casing part 36″ by two annular seals 96 and 97, which are slightly spaced apart axially, fixed to the casing part 36″ which is introduced into the bore 44 of the casing part 36′. An annular space 98 remaining between these annular seals 96 and 97 is in communicating connection via a cross-channel 99 of the adapter 79 with the inner annular groove 83 of the bore 44 of the casing part 36". The bore 44 is in communicating connection via the substantially radial cross-channel 84 of the casing part 36' with the chamber 86' of the brake fluid reservoir 86 assigned to the front axle brake circuit.

The annular seal 96 facing the primary output pressure space 16, is designed as a flexible lip seal, and supports itself against an annular disk 101. The disk 101 is arranged fixed to the casing and is provided with bores 102 arranged in axial-symmetrical distribution. As long as the pressure in the primary output pressure space 16 is greater than in the annular space 98 communicating with the reservoir chamber 86', this bore 102 is closed by the lip seal 96. However, due to its flexibility, the lip seal 96 acts in combination with the annular disk 101 and its bores 102 as a non-return valve which is activated in the opening direction by higher pressure in the brake fluid reservoir 86 than in the primary output pressure space 16. Via this non-return valve, in this case, a fresh supply of brake fluid can then flow from the chamber 86' of the brake fluid reservoir 86, which is assigned to the front axle brake circuit, and into the primary output pressure space 6 even before a balancing valve 103, provided for the purpose of releasing the "normal" balancing flow path, has reached its open position.

This type of "replenishment" of brake fluid to the primary output pressure space 16 of the brake pressure control unit 10 is a safety measure, which makes possible in the event that the front axle brake circuit suffers from leakages, which lead o a slight loss in brake fluid even during normal braking, to supplement the brake fluid in the primary output pressure space 16 of the brake pressure control unit 10 during a return movement of the primary piston 18. This is before the balancing valve 103 has cleared the balancing flow path coming from the brake fluid reservoir 86, which would not be the case until in the direct "vicinity" of the basic position of the primary piston 18 of the brake pressure control unit 10. Even in the event of vapor pockets forming in the front axle brake circuit, utilizing the non-return valve effect of this lip seal 96, it is possible by repeated "pumping movements" of the brake pedal to feed brake fluid into the primary output pressure space 16.

The second, inner annular seal 97, by means of which the annular piston 87 is sealed from the adapted 79 of the casing part 36", is designed as an O-ring, which is arranged between two retaining rings fixed to the casing.

The external diameter of the circular-cylindrical section 87" of the annular piston 87 is slightly smaller than the diameter of its piston flange 87' on the pressure space side. This piston flange 87 is sealed from the bore 78 of the casing part 36" receiving the primary piston 18 by an outer O-ring seal 104, fixed to the piston 18, so that an annular gap-shaped intermediate space 106 remains between this O-ring seal 104 or the piston flange 87' and the annular seal 97 sealing the piston flange 87' on the inside from the adapter 79. This intermediate space 106 is closed off fluid-tight and pressure-tight both from the annular space 98 and from the drive pressure space 24, the annular space 98 being filled with brake fluid and pressureless.

The plunger piston 89 of the primary piston 18 is designed as a step piston, which has a larger piston stage 89', in terms of diameter, whose diameter corresponds to the internal diameter of the tubular section 87" of the primary piston. The plunger piston 89 has a smaller piston stage 89", in terms of diameter, which protrudes into the drive pressure space 24 and passes through it and whose diameter corresponds to the correspondingly smaller diameter of the piston flange 87' of the annular piston. The piston flange 87' is sealed from the smaller piston stage 89" of the plunger piston 89 by an inner O-ring seal 107.

The larger piston stage 89' of the plunger piston 89 is sealed from the tubular section 87" of the annular piston 87 on the inside by an O-ring seal 108, which is arranged in the direct vicinity of an annular fold 109, by which the larger piston stage 89' adjoins the smaller piston stage 89". There thus remains between the seal 108 which is fixed to the plunger piston 89 and the inner annular seal 107 which is fixed to the annular piston 87, between the annular fold 109 and the piston flange 87' of the annular piston 87, a further annular gap-shaped space 111, which is closed off fluid-tight and pressure-tight both from the primary output pressure space 16 and from the drive pressure space 24.

The diameter of the circular opening bounded by the stop flange 92, via which opening the drive pressure space 24 of the brake pressure control unit 10 communicates with the inside of the bore 78, in which the primary piston 87 is displaceably guided by its piston flange 87', is somewhat larger than the diameter of the smaller piston stage 89" of the secondary piston flange 89. Thus, the annular end face 112 of the piston flange 87' assigned to the work pressure space 24, can be pressurized directly by the output pressure of the brake valve 23 of the brake power booster 21 prevailing in the drive pressure space 24.

The inner annular space 111 is connected by cross-bores 113 of the annular piston 87 so as to communicate with the radially outer annular space 106 bounded by the annular piston 87 and the casing bore 78.

This annular space 106 is connected via a radial cross-channel 114 so as to communicate with an inner annular groove 116 of the casing part 36'. This groove 116 is arranged, as seen from the primary pressure space 16, outside the bore 44 of the casing part 36' bounding the adapter 79 of the casing part 36" from the primary output pressure space 16, within the bore 44. This annular groove 116 is connected via a further, substantially radial cross-channel 117 so as to communicate with the separating space 52 which is bounded in axial direction within the further casing bore 42 by the sealing sleeves 51 and 53. This separating space 52 communicates via a cross-bore 118 of the casing part 36', which in the specific exemplary embodiment illustrated is open toward the outer space, with the outer space.

The annular spaces 111, 106, 116 and 52, which are kept pressureless, overall have the effect of achieving an effective hydraulic separation of those drive pressure spaces 24 and 59 which contain hydraulic oil as working medium from the respective neighboring primary output pressure space 16 on the one hand and the secondary output pressure space 17 on the other hand, both of which contain brake fluid as working medium. The possibility of hydraulic oil, which is used as the working medium within the brake power booster 21 and in the double-acting drive cylinder 59, 54, 61, being able to mix with brake fluid is effectively ruled out.

The blind bore 34, within which the first control pressure space 37 is bounded by the floating piston 33, according to the representation of FIG. 1, extends over approximately half its length within a tubularly designed guide part 119, which projects into the primary output pressure space and whose external diameter is smaller than the internal diameter of the region of the primary output pressure space 16 which is coaxial to this guide part 119. Thus, there remains between the radially outer wall of the primary output pressure space 16 and the outer wall of the guide part 119 an annular groove 121, which is open toward the primary piston side. The groove base of the groove 121 is formed by an annular surface 122 bounding the primary output pressure space 16 at the end face.

The guide part 119 is surrounded by a pot-shaped sleeve 123, whose cylindrical shell 123' hugs the guide part 119, the sleeve 123 nevertheless being smoothly displaceable on the guide part 119. The rim of the sleeve 123 facing the annular end face wall 122 of the primary output pressure space 16 is designed as a radial flange 123", which bears a sealing ring 124 on its side facing the end facing wall 122. Opposite this sealing ring 124, on the side of the flange 123" of the sleeve 123, a compression spring 126 engages which, according to the representation of FIG. 1 is short, is moderately biased and supports itself against a support ring 127 which is fixed to the casing. Seen in axial direction, the support ring 127 is arranged approximately in the center of the annular groove 121.

The support ring 127 also forms the abutments, fixed to the casing 36, for the restoring spring 91, which urges the primary piston 18 into its illustrated basic position. This restoring spring 91 supports itself against the radially outer rim of a spring support plate 128, which supports itself against the end face flange 93 of the plunger piston 89.

The floating piston 33 has a connecting rod piece 129, which protrudes through a central opening of the bottom of the pot-shaped sleeve 123 into the primary output pressure space 16. The connecting rod piece 129 is reduced by an annular radial stop face 135 with respect to the section of the floating piston 33 which is guided in the blind bore 34 and is supportable by this stop face 135 against the bottom of the pot-shaped sleeve 123. The connecting rod piece 129 is continued by a rod-shaped extension 131, which is clearly smaller in diameter, passes through a central opening 132 of the spring support plate 128 and, seen in the basic position illustrated, protrudes by a short end section into a central blind bore 133 of the plunger piston 89. The axial length of the blind bore 133 is dimensioned large enough to be able to accommodate fully the rod-shaped extension 131, that is to say to displace the plunger piston 89 or the primary piston until there is contact of the support plate 128 against the connecting rod piece 129 of the floating piston 33.

The rod-shaped extension 131 is provided on its end section protruding into the blind bore 133 with a stop ring 134, which engages behind the rim of the central opening 132 of the spring support plate 128 on the plunger piston side. By its contact against the spring support plate 128, the stop ring 134 entrains the floating piston 33 whenever the plunger piston 89 of the primary piston 18 reaches the vicinity of its illustrated basic position at the termination of a braking operation, and thereby also "draws" the plunger piston 33 into its illustrated position. In this basic position of the primary piston 18 and of the floating piston 33, the entrainment of the pot-shaped sleeve 123 by the floating piston 33 also has the effect of lifting the sealing ring 124 of the balancing valve 103 off the annular, inner end face 122 of the primary output pressure space 16. This releases the communicating connection of a balance bore 136 which opens outward in this annular face 122 into the primary output pressure space 16 and is connected to the chamber 86' of the brake fluid reservoir 86 assigned to the front axle brake circuit.

A balance bore 137, which opens out at the end face centrally into the first control pressure space 37 and is connected to the chamber 86" of the brake fluid reservoir 86 assigned to the rear axle brake circuit, can be closed or released by a central valve, which is designed as a needle valve 138. In the basic position of the floating piston 33, represented in the corresponding non-operated state of the brake system, the central valve 138 assumes its open position and, after a slight initial stroke of the floating piston 33 in the sense of a pressure build-up in the first control pressure space 37 or in the rear axle brake circuit, reaches its closed position blocking off the control pressure space 37 from the brake fluid reservoir 86. A balance bore 139, imparting in the basic position of the secondary piston 19 the communicating connection of the secondary output pressure space 17 with the chamber 86" of the brake fluid reservoir 86 assigned to the rear axle brake circuit, is designed in the exemplary embodiment illustrated as a so-called snifting bore, which, as soon as the secondary piston 19 or its piston flange has passed over the snifting bore 139 in the course of a pressure build-up movement, is blocked off from the secondary output pressure space 17.

The piston flange 49, movably bounding the secondary output pressure space 17, is provided with at least one follow-up bore 141. As long as the pressure in the secondary output pressure space 17 is higher than in the oppositely arranged follow-up space 142, which is in constant communicating connection with the chamber 86" of the brake fluid reservoir assigned to the rear axle brake circuit 13, 14, the follow-up bore 141 is tightly closed by the flexible lip seal 143. Otherwise, for example when there is a rapid return movement of the secondary piston 19, the follow-up bore 141 makes it possible for a fresh supply of brake fluid to run from the follow-up space 142 into the secondary output pressure space 17, as already explained above with reference to the annular seal 96 of the primary piston 18.

The brake pressure control unit 10 according to the invention operates as follows:

The feeding of the pedal power-proportional booster output pressure into the drive pressure space 24 has the effect of displacing the primary piston 18 as a whole to the left, according to FIG. 1. The fact that the pressurized annular surface 112 of the annular piston 87 is somewhat larger than the effective drive surface of the plunger piston 89 has the effect that the annular piston 87 as it were "draws with it" the plunger piston 89. The displacement of the primary piston 18 has the effect that the floating piston 33 can also move, to the left according to FIG. 1, by the force of the compression spring 126, as a result of which the balancing valve 103 and the central valve 138 reach their blocking positions.

Further piston displacement has the effect of building up brake pressure both in the primary output pressure space 16 and in the control pressure spaces 37 and 39, and in the secondary output pressure space 17. The drive pressure spaces 59 and 61 of the double-acting hydraulic cylinder 59, 54, 61 are relieved with respect to the reservoir 63 of the hydraulic auxiliary pressure source when there is braking not subjected to regulation.

If the pedal power is throttled back, the restoring spring 91 presses the primary piston 18 into its basic position, as a result of which the closing elements of the balancing valve 103 and of the central valve 138 are drawn by a striking effect into their open positions and the balance bores 136 and 137 are released.

The secondary piston 19 is urged back into its basic position by the restoring spring 57. In the event of a failure of the auxiliary pressure source, that is to say if no assisting auxiliary pressure is input into the drive pressure space 24, the plunger piston 89 remains displaceable by pedal power alone, it still being possible, with lengthening of the pedal travel, for an adequate braking pressure for sufficiently good braking deceleration to be built up in the front axle brake circuit and in the rear axle brake circuit.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Brake pressure control unit for a hydraulic dual circuit brake system of a road vehicle which is equipped with a hydraulic brake power booster which comprises a constantly supercharged hydraulic pressure accumulator and a brake valve connected to said accumulator, said accumulator inputting into a drive pressure space of the brake pressure control unit when said brake system is operated a pressure which is proportional to an operating force and acts directly on a drive surface of a primary piston, said pressure imparting a longitudinal displacement on said primary piston and a longitudinal displacement on a secondary piston in the sense of a brake pressure build-up in a primary output pressure space and in a secondary output pressure space of the brake pressure control unit, respectively, said vehicle having a static brake circuit connected to each of said primary and secondary output pressure spaces, said primary piston comprising an annular piston sealed from a bore of a casing, and a plunger piston arranged displaceably in a central bore of said annular piston and sealed from said annular piston, said plunger piston having a radial driving flange against which said annular piston is supportable by its end face toward the primary output pressure space, said annular piston and said plunger piston being pressurizable by said drive pressure inputtable into said drive pressure space and jointly displaceable in the sense of said brake pressure build-up, said plunger piston remaining displaceable by pedal power alone during a failure of an auxiliary pressure source, said control unit comprising:
   a first annular seal of said annular piston on the piston side, a flange facing the drive pressure space on which said first seal is arranged;
   a second annular seal fixed to said casing and arranged on the end section facing the primary output pressure space of the casing bore guiding said annular piston,
   said first and second annular seals forming an outer separating space in the shape of an annular gap;
   a third annular seal arranged at an inner bore of said drive flange of said annular piston; and
   a fourth annular seal arranged at said plunger piston and offset in the direction of said primary output pressure space,
   said third and fourth annular seals sealing said annular piston and said plunger piston from each other.

2. Brake pressure control unit according to claim 1, wherein said plunger piston is a step piston, with a first stage which protrudes into said drive pressure space and is sealed from said annular piston by said third annular seal; said first stage having a smaller diameter than a second stage guided in said annular piston bore on said output pressure space side and sealed from said annular piston by said fourth annular seal.

3. Brake pressure control unit according to claim 1, wherein said annular piston has an annular groove between said third annular seal and said fourth annular seal which communicates with said outer separating space via a cross-channel.

4. Brake pressure control unit according to claim 3, further including a second separating space wherein said two separating spaces are at least one of filled with a separating medium and are vented to outer space.

5. Brake pressure control unit according to claim 4, wherein said primary output pressure space has a balance bore, said control unit further comprising a sealing element for closing and opening said balance bore, said sealing element being movable of its own accord into a position closing the balance bore when said plunger piston is displaced in the sense of a brake pressure build-up.

6. Brake pressure control unit according to claim 5, wherein said balance bore is arranged on an end face wall of said primary piston, said sealing element being an annular seal arranged at a rim of a pot-shaped sleeve having a bottom, said control unit further comprising: a floating piston having an extension passing through said bottom of said pot-shaped sleeve, said extension poining towards said plunger piston and provided at an end on said plunger piston side with a stop ring, said stop ring have a side facing the floating piston against which a spring support plate is supportable; a first compression spring supported against said casing for biasing said spring support plate into contact with a free face of said plunger piston; said floating piston having an annular stop stage supportable against a rim of a central bottom opening of said pot-shaped sleeve, said annular stop stage in the basic position of the floating piston, lifting said sleeve from its position imparting a seal on said balance bore; a second compression spring supported fixedly to said casing for biasing said sleeve into contact with said stop stage of said floating piston and into said closing position of said sealing element as soon as said plunger piston has executed a small fraction of a pressure build-up stroke, wherein the second compression spring is therefore able to move said floating piston in the sense of a pressure build-up and the sleeve in said closing direction of said valve element.

7. Brake pressure control unit according to claim 6 further comprising:
   a first control pressure space bounded by said floating piston within a blind bore of said casing co-axial with a first bore bounding said primary output pressure space, said first control pressure space connected by a cross-channel to communicate with a second control pressure space, said second control pressure space being bounded fixedly with respect to said casing by a blind hole-shaped end section of a second bore and is bounded movably by a drive piston;
   a second floating piston arranged in said second bore displaceable against restoring force of a third spring in response to pressurization in said second bore with the pressure prevailing in the control pressure spaces, said floating piston movably bounding within said second bore said secondary output pressure space;

a piston rod for connecting said second floating piston to the piston of a double-acting hydraulic drive cylinder, said drive cylinder having a radial casing boundary formed by a bore stage of said second bore, said bore stage having a diameter greater than that of said control pressure space; said floating piston being displaceable by alternate pressurization and relief of working spaces of said double-acting hydraulic cylinder in the sense of either a volume enlargement or reduction of said secondary output pressure space;

a follow-up space constantly in communicating connection with a brake fluid reservoir and extending between the piston movably bounding said second control pressure space and the flange of the floating piston movably bounding sid second output pressure space;

a non-return valve means through which fresh supply of brake fluid can flow from said follow-up space into the secondary output pressure space when a return movement of said floating piston takes place in the sense of a pressure reduction in the secondary output pressure space; and a pressureless separating space extending between the secondary output pressure space and a said working space of the double-acting hydraulic cylinder which is closest to said secondary output pressure space, as seen in axial direction, the axial bounds of said pressureless separating space being formed by sealing sleeves fixed to said casing, said piston rod connecting said drive piston of said hydraulic cylinder to said piston flange bounding the secondary output pressure space being displaceably guided pressure-tight through said sealing sleeves.

8. Brake pressure control unit according to claim 7, for a vehicle which is equipped with at least one of an antilocking system and a propulsion regulation system, wherein appropriate regulatory brake pressure modulation in said brake circuit is regulated by at least one of a select-low principle and on the driven vehicle axle.

9. Brake pressure control unit according to claim 8, wherein brake pressure in the rear axle of the vehicle in the sense of an at least temporary brake pressure increase proportional to the axle load is used for axle load dependent control.

* * * * *